United States Patent
Maioli et al.

(10) Patent No.: US 9,455,558 B2
(45) Date of Patent: Sep. 27, 2016

(54) ELECTRICAL POWER TRANSMISSION LINE COMPRISING A CORROSION-PROTECTED RACEWAY AND METHOD OF PROTECTING A RACEWAY FROM CORROSION

(75) Inventors: Paolo Maioli, Milan (IT); Rodolfo Sica, Milan (IT); Pietro Anelli, Milan (IT)

(73) Assignee: PRYSMIAN S.P.A, Milan (IT)

( * ) Notice: Subject to any disclaimer, the term of this patent is extended or adjusted under 35 U.S.C. 154(b) by 117 days.

(21) Appl. No.: 14/350,846

(22) PCT Filed: Oct. 11, 2011

(86) PCT No.: PCT/EP2011/005063
§ 371 (c)(1),
(2), (4) Date: Jul. 8, 2014

(87) PCT Pub. No.: WO2013/053368
PCT Pub. Date: Apr. 18, 2013

(65) Prior Publication Data
US 2014/0326478 A1  Nov. 6, 2014

(51) Int. Cl.
*H02G 3/04* (2006.01)
*H02G 3/06* (2006.01)

(52) U.S. Cl.
CPC .......... *H02G 3/0437* (2013.01); *H02G 3/0418* (2013.01); *H02G 3/0608* (2013.01)

(58) Field of Classification Search
CPC ........... H02G 9/025; H02G 9/06; H02G 9/10
USPC ........................................................ 174/24
See application file for complete search history.

(56) References Cited

U.S. PATENT DOCUMENTS

| | | | |
|---|---|---|---|
| 3,160,702 A | * | 12/1964 | Lapsley ................ H01B 7/26 174/106 R |
| 3,463,745 A | | 8/1969 | Hofrichter et al. |
| 3,873,476 A | | 3/1975 | Jabs et al. |
| 4,377,645 A | | 3/1983 | Guthrie et al. |
| 4,638,017 A | | 1/1987 | Larson et al. |
| 4,738,992 A | | 4/1988 | Larson et al. |

(Continued)

FOREIGN PATENT DOCUMENTS

| | | |
|---|---|---|
| EP | 0 818 426 | 1/1998 |
| EP | 2 280 462 | 2/2011 |

(Continued)

OTHER PUBLICATIONS

Freudenberg Vliesstoffe KG, "Nonwovens for the cable industry", K3415 Technical Data, XP55037547, Retrieved from the internet: www.viledon-kabel-elektro.de/pdf/kabel/DatasheetK3415.pdf, 1 page, (2010).

(Continued)

*Primary Examiner* — Chau N Nguyen
(74) *Attorney, Agent, or Firm* — Finnegan, Henderson, Farabow, Garrett & Dunner, L.L.P.

(57) ABSTRACT

An electrical power transmission line includes: at least one electrical cable; a raceway made of ferromagnetic material including a base and a cover defining an inner housing space for housing the electrical cable; a wet basic filling material having a pH between 11 and 13 housed in the inner housing space and embedding the at least one electrical cable. In order to achieve corrosion protection of the raceway, the inner surface of the cover is in contact with a basic passivating material having a pH between 11 and 13.

16 Claims, 7 Drawing Sheets

(56) References Cited

U.S. PATENT DOCUMENTS

| | | | |
|---|---|---|---|
| 6,167,913 B1* | 1/2001 | Wood | B29C 63/34 138/97 |
| 6,806,418 B2* | 10/2004 | Donazzi | H02G 9/06 174/110 R |
| 7,700,879 B2* | 4/2010 | Watanabe | H01B 7/16 174/102 R |
| 8,686,290 B2* | 4/2014 | Orini | H01B 7/225 174/102 R |
| 2002/0044836 A1 | 4/2002 | Caslini et al. | |
| 2004/0229536 A1* | 11/2004 | Bahlmann | B32B 5/26 442/86 |
| 2006/0104010 A1 | 5/2006 | Donazzi et al. | |
| 2009/0188694 A1* | 7/2009 | Pereira | H02G 3/0468 174/112 |
| 2009/0264549 A1 | 10/2009 | Brown | |

FOREIGN PATENT DOCUMENTS

| | | |
|---|---|---|
| WO | WO 99/64367 | 12/1999 |
| WO | WO 2004/034539 | 4/2004 |
| WO | WO 2007/110145 | 10/2007 |

OTHER PUBLICATIONS

Mapei, "Mapefer 1K", XP55037549, Retrieved from the Internet: www.bondedmaterials.net/pdf_product/Mapefer1k.pdf, 4 pages, (2011).

Maioli, P. et al., "Evaluation of the life of magnetic shielding raceways underground", CIGRE' EMF-ELF-2011 Conference, Paris, Paper No. 39, pp. 1-7, (2011).

Estrela, C. et al., "Surface Tension of Calcium Hydroxide Associated With Different Substances", Journal of Applied Oral Science, 13(2): pp. 152-156, (2005).

International Search Report from the European Patent Office for International Application No. PCT/EP2011/005063, mailing date Sep. 17, 2012.

Written Opinion of the International Searching Authority from the European Patent Office for International Application PCT/EP2011/005063, mailing date Sep. 17, 2012.

Notification of First Office Action in counterpart Chinease Application No. 201180075195.0, dated Mar. 29, 2016.

* cited by examiner

ELECTRICAL POWER TRANSMISSION LINE COMPRISING A CORROSION-PROTECTED RACEWAY AND METHOD OF PROTECTING A RACEWAY FROM CORROSION

CROSS REFERENCE TO RELATED APPLICATION

This application is a national phase application based on PCT/EP2011/005063, filed Oct. 11, 2011, the content of which is incorporated herein by reference.

FIELD OF THE INVENTION

The present invention relates to an electrical power transmission line comprising a corrosion-protected raceway and to a method of protecting said raceway from corrosion.

BACKGROUND OF THE INVENTION

Generally, a high-power underground electrical transmission line is designed to operate at medium voltages (typically from 10 to 60 kV) and high voltages (typically higher than 60 kV), and currents of the order of hundreds of amperes (typically from 500 to 2000 A). The electrical power carried in these lines can reach values of the order of hundreds of MVA, typically 400 MVA. Normally, the current carried is an alternating current at low frequency, in other words generally below 400 Hz, and typically at 50-60 Hz. In general, these lines are used for transferring power from electrical power stations to urban centres, over distances of the order of tens of km (normally 10-100 km).

Typically, electrical power transmission lines are three-phase lines comprising three cables buried in a trench at a depth of 1-1.5 m. In the space immediately surrounding the cables, the magnetic field H can reach relatively high values and, at ground level (i.e. at 1-1.5 m distance from the line), a magnetic induction as high as 20-60 µT (depending on the geometrical arrangement of the cables with respect to each other) can be measured.

To avoid possible biological effects due to exposure to magnetic fields of this size generated by low-frequency (50 Hz) sources, a "safety threshold" is considered, below which the probability of biological damage can be reduced to a minimum, if not eliminated. A threshold of magnetic induction on which some national legislation is tending to become harmonized, is 0.2 µT, a value which is approximately 100 times smaller than that generated by an unshielded three phase line as indicated above.

RELATED ART

As it is known, shielding raceways can mitigate the magnetic field generated by power cables housed in the same.

Conveniently, two-pieced raceways can be used, made of ferromagnetic material comprising a base and a cover defining an inner housing space for housing one or more electrical cables which are embedded in a wet filling material, such as concrete or sand, poured into the inner housing space defined in the raceway.

The two components (base and cover) of the raceway allow the inspection of the cables both during the laying of the line and, subsequently, when the line is in use.

The filling material is adequately wetted so as to firmly hold in place the electrical cables housed within the inner housing space. Moreover, the wet filling material helps to dissipate the heat generated by Joule effect by the cables during use so as to maintain their operating temperature below a threshold temperature, for example below 90° C., in order to maintain within acceptable limits the power dissipated due to the Joule effect.

A two-pieces raceway of this kind is disclosed, for example, in International patent application WO 04/034539 in the name of the same Applicant.

SUMMARY

The Applicant has observed that an improper laying of the raceway in a trench or an improper filling of the inner housing space defined within the raceway (caused in turn, e.g. by an improper laying of the raceway and/or by an improper pouring and compaction of the wet filling material in the raceway) can result in the creation of air gap between the free upper surface of the wet filling material and the lower surface of the raceway cover.

If this occurs, the raceway cover is not in contact with the wet filling material (concrete or other material) along its lower surface so that, during the thermal cycles which occur when the transmission line is in use, part of the water contained in the filling material may evaporate and condense on the exposed areas of the lower surface of the cover creating a thin film of condensed pure water thereon.

The Applicant has also observed that the difference in salinity between the condensed pure water wetting the bare lower surface of the raceway cover and the aqueous solution impregnating the filling material can cause an electrochemical potential difference which triggers harmful corrosion phenomena of the cover.

The Applicant has realized that these corrosion phenomena of the cover can be efficiently prevented or at least minimized during the lifetime of the transmission line by contacting the lower surface of the raceway cover with a suitable passivating material.

In particular, the Applicant realized that the presence of a basic passivating material on the inner surface of the raceway cover, that is, the surface facing the housing space, provides a barrier to corrosion phenomena which presently affect the known raceways.

According to a first aspect, it has been found an electrical power transmission line, comprising:
 at least one electrical cable;
 a raceway made of ferromagnetic material comprising a base and a cover defining an inner housing space for housing said at least one electrical cable;
 a wet basic filling material housed in said inner housing space and embedding said at least one electrical cable; said filling material having a pH comprised between 11 and 13;
 wherein the inner surface of said cover facing the filling material is in contact with a basic passivating material having a pH value capable of passivating the ferromagnetic material.

Preferably, the basic passivating material has a pH of from 10 to 14, more preferably of from 11 to 13.

For the purposes of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Within the framework of the description and in the subsequent claims, the term: pure water is used to indicate condensation water substantially without impurities (e.g. mineral ions).

Within the framework of the description and in the subsequent claims, the term: wet basic filling material is used to indicate a filler material impregnated by a wetting aqueous medium, such as water, including ion species, such as for example metal ions $M^+$ and hydroxide ions $OH^-$, released by the basic filler material itself.

Within the framework of the description and in the subsequent claims, the term: basic passivating material is used to indicate a suitable material as defined herein having a pH value capable of passivating the inner surface of the raceway cover (or the zinc of the cover, if present), maintaining said surface to a basic pH.

Within the framework of the description and in the subsequent claims, the term: basic passivating layer is used to indicate a layer made of a suitable passivating material as defined herein.

Within the framework of the description and in the subsequent claims, the term: passivation is used to indicate the spontaneous formation of a compact protective surface film, made for example of calcium hydroxyzincate and/or gamma-$Fe_2O_3$, on the metal surface that inhibits further corrosion.

Within the framework of the description and in the subsequent claims, the pH value of any material as described herein is intended to be measured with a pHmeter in contact with the material, more precisely with the aqueous solution wetting or impregnating the material itself, at a room temperature (typically from 20° to 27° C.). Accordingly, any pH value is actually referred to the aqueous solution which impregnates the material and which imparts to the same the measured pH value.

The Applicant has experimentally found that thanks to the provision of a basic passivating material along the inner surface of the raceway cover facing the basic filling material, more preferably along the whole inner surface facing the basic filling material, it becomes advantageously possible to avoid in a fairly simple and cost-effective way the formation of electrochemical potential differences which may trigger corrosion phenomena of the cover.

This brings, in turn, the advantage of simplifying the laying operations of the raceway in the trench which may be carried out without taking special measures even in moderate sloping conditions or when the bottom of the trench is particularly disconnected.

In a preferred embodiment, the ferromagnetic material of the raceway is low carbon Hot Dip Galvanized (HDG) steel with a zinc layer firmly bonded thereto.

In this way, the raceway may be manufactured using materials readily available on the market as staple items.

In addition, the raceway of the present disclosure may be advantageously protected against corrosion by adopting a relatively thin zinc layer achieving an advantageous cost reduction.

The Applicant has in fact observed that in the absence of the present passivation a raceway intended to be left in the ground for 30 years should be provided with a zinc layer having a thickness of 150-300 μm (the corrosion rate being, of about 5-10 μm/year). The raceway protected according to the disclosure, in sharp contrast, can he covered with a zinc layer having a thickness equal to or lower than 30 μm.

More preferably, the zinc layer has a thickness of from 15 to 30 μm.

Preferably, the basic filling material of the raceway is selected from the group comprising: cement mortar, alkaline sand, or mixtures thereof.

Preferably, a suitable cement mortar for the purposes of the present disclosure is obtained by mixing ordinary Portland cement (OPC) with sand and water in proportions which may be determined by a man skilled in the art.

Preferably, the sand has a degree of humidity of from 10 to 15 wt %. Preferably, the total amount of CaO in the OPC is from 55 wt % to 65 wt % and in the cement mortar is from 2.7 to 3 wt %.

The Applicant has found that such an amount of CaO, precursor of $Ca(OH)_2$ that generates upon dissolution the main ionic components of the pore aqueous solution which impregnates concrete mixtures ($Ca^{++}$ and $OH^-$), is sufficient to promote a proper zinc and steel passivation, and to avoid increasing the corrosion velocity of the zinc layer as shall become clearer from the following description.

Preferably, the composition of the cement mortar is: sand 85-87 wt %, OPC 4.3-4.7 wt % and water 8.7-9.6 wt %.

The most preferred composition of the cement mortar is p s by weight): siliceous sand 86 wt %, OPC 4.5 wt % and tap water 9.5 wt %.

Preferably, the cement mortar has a pH comprised between 11 and 12.

The Applicant has experimentally found that the effect of protection against corrosion of the raceway cover may be optimized.

Alkaline sands suitable for the present invention are those described in US patent application No. 2002/0044836 in the name of the same Applicant, for example silica, calcareous, quartz or feldspar sands, whether found in nature or artificial.

Said sands can be mixed with small amounts of cement, as described in the aforementioned US patent application (2-12 wt %), which help to create mechanical links between the various sand grains.

Preferably, said basic passivating material can be one of at least one water swellable material; a basic mortar having a pH of from 10 to 14, more preferably of from 11 to 13; or a polymeric porous material in direct contact with said wet basic filling material and having a sorptivity value comprised of from 5 to 50 (mm/min$^{1/2}$), preferably of from 10 to 15 (mm/min$^{1/2}$) and a mean pore diameter of from 10 to 200 μm, preferably of from 20 to 100 μm.

Preferably, the water swellable material is a superabsorbent polymer (SAP) selected from the group comprising: sodium polyacrylate, polyacrylamide copolymer, ethylene maleic anhydride copolymer, cross-linked carboxymethylcellulose (CMC) or sodium salt thereof (for example the products Blanose® from Hercules), polyvinyl alcohol (PVA) copolymers, cross-linked polyethylene glycol (PEG), starch grafted copolymer of polyacrylonitrile (PAN) or acrylamide/sodium acrylate (for example the products SGP Absorbent Polymer® from Henkel AG).

Within the framework of the description and in the subsequent claims, the term: sodium polyacrylate is used to indicate partially or fully neutralized polyacrylate (i.e. polyacrylic acid that has been cross-linked and at least partially or fully salified, for example the products Cabloc® from Evonik Stockhausen GmbH, or Waterlock® from Sanyo, or Viscomate™ from SHOWA DENKO K.K.)

The Applicant has observed that when the basic passivating material is formed by a water swellable material the cover of the raceway is advantageously put in ionic contact with the wet basic filling material in a very simple manner by simply laying the water swellable material on the upper free surface of the filling material.

Thereafter, the water swellable material spontaneously absorbs the ion-laden basic aqueous solution impregnating the wet basic filling material expanding and forming a gel-type basic passivating layer having the same pH of the wet filling material and which comes in contact with the whole inner surface of the raceway cover.

Thus, any air gap, which could be formed between the lower surface of the raceway cover and the upper surface of the wet filling material is filled by the water swellable material once the latter has expanded upon absorption, of the basic pore aqueous solution drained by capillarity from the filling material.

In this way, the inner surface of the raceway cover is wetted only by the alkaline pore aqueous solution of the filling material which advantageously passivates the cover, which may be made of galvanized or bare steel, eliminating or at least minimizing any corrosion phenomena.

While not wishing to be bound by any theory, the present inventors believe that the passivation mechanism may be attributed to the formation of an intermetallic compound on the zinc layer of the cover or of a protective oxide on the cover, if the latter is made of bare steel, due to an interaction of the basic pore aqueous solution impregnating the filling material with the cover inner surface.

An example of such an intermetallic compound is calcium hydroxyzincate which may be formed by the reaction of $Ca(OH)_2$ and zinc, while an example of a protective oxide is gamma-$Fe_2O_3$ which may be formed on bare steel surfaces in a basic environment.

In a preferred embodiment, the water swellable material is in the form of powder.

In this way, the laying operations of the water swellable material on the upper free surface of the wet filling material may be advantageously simplified.

Preferably, said water swellable materials are capable of assuming a gel form when contacted with an aqueous medium. Advantageously, such a gel form shows good elasticity, suitable long term thermal-chemical stability, as well as the ability of repairing itself in case of rupture of the filling material.

Preferably, said at least one water swellable material has an expansion degree of from 5 to 500 volume/volume, preferably of from 10 to 200 volume/volume, and more preferably of from 10 to 50 volume/volume.

Within the framework of the description and in the subsequent claims, the term: expansion degree is used to indicate the ratio between the volume after expansion and the volume before expansion as measured in the following manner.

A layer of absorbing powder uniformly spread on a reference plane is put in contact with a water film with a disc of known weight resting on top of the layer. The water absorption and layer expansion thereof lifts the disc and the movement, monitored by a displacement transducer, gives the material expansion due to water absorption versus time. A preferred method for measuring the expansion degree of a water swellable material will be described in the following Example 1.

In this way, the expansion degree of the water swellable material advantageously avoids that any air gap may be created between the lower surface of the raceway cover and the upper surface of the wet filling material.

Preferably, said at least one water swellable material has a thickness, after expansion within the raceway, of from 0.3 mm to 10 mm, preferably of from 3 mm to 6 mm in order to cope with as many situations as possible which may occur in practice, in terms of extension of the air gap between the free upper surface of the wet filling material and the lower surface of the raceway cover.

Preferably, the amount before swelling of said water swellable material with respect to the area of the upper surface of the filling material may vary from 2 $g/m^2$ to 200 $g/m^2$ as a function of the laying conditions of the raceway in the trench which may determine the formation of the aforementioned the air gap between the free upper surface of the wet filling material and the lower surface of the raceway cover.

Preferably, the amount before swelling of said water swellable material with respect to the area of the free upper surface of the filling material varies for most practical applications from 60 $g/m^2$ to 140 $g/m^2$, more preferably from 90 $g/m^2$ to 130 $g/m^2$.

In a preferred embodiment, said basic passivating material further comprises at least one supporting layer of said at least one water swellable material.

Preferably, said supporting layer is made of a supporting tape, so that the passivating material is formed in this case by a water swellable tape comprising a water swellable material supported by the a tape layer.

For the purposes of the invention, water swellable tapes preferably generally comprise a polymeric base tape layer on the surface of which a superabsorbent swellable material (e.g. polyacrylate, polymethyl methacrylate or polyvinyl alcohol) in the form of powder is chemically or thermally bonded.

The water swellable tape can be either a double-layer tape, for instance made of a first layer made of woven (e.g. polyethylene terephthalate) or nonwoven material (e.g. polyester), onto which a second layer of superabsorbent material is bonded, or a three-layer tape, for instance comprising a first layer made of woven or nonwoven material, a second layer made of woven or nonwoven material and a third interposed layer made of a superabsorbent material.

Water-swellable tapes suitable for the purposes of present invention are preferably those commercialized by Freudenberg under the trademark Viledon®, e.g. Viledon® K3415, K3416, K3417 or K3516 and those commercialized by Geca-Tapes under the trademark TopSwell®, e.g. GTI1220 and GFS1120. The water-swellable tapes marketed with the trade names of Viledon® K3415 and GFS1120 have been shown to be particularly suitable.

In a preferred embodiment, the aforementioned basic passivating material made of basic mortar comprises a mixture including a cement base and an inert component. When added with water, said mixture becomes pasty and easily smearable, also in upside-down position, on the surface to be protected, and has a strong alkaline reaction when in contact with water.

For example, said cement base and inert component mixture, when added with water, has a Brookfield viscosity of from 10 to 100 Pa·s (#C rpm 10; 23° C.) preferably of from 50 to 60 Pa·s.

The inert component may be a cement-reactive component, such as for example a suitable sand and/or a cement non-reactive component, such as for example polymeric powders or fibrils.

In a preferred embodiment, the aforementioned basic passivating material made of basic mortar is a mono-component anti-corrosion cementitious mortar.

Mono-component anti-corrosion cementitious mortars of preferred use for the purposes of the present invention as a basic passivating material are those marketed by Mapei S.p.A. (Milan, Italy) under the trade name of Mapefer® 1K.

Such mortars comprises cement binders, an inert component of polymeric nature and corrosion inhibitors and have a Brookfield viscosity of from 40 to 70 Pa·s and a pH of from 12 to 13.

In a preferred embodiment, the aforementioned polymeric porous material is of the type known as open cell polymer foams or sponges obtained by introducing tailored foaming agents in a polymer matrix.

As mentioned above, the polymeric porous material has porous structure having a mean pore diameter comprised from 10 to 200 µm, more preferably from 20 to 100 µm and, still more preferably, from 40 to 100 µm.

This preferred feature is particularly advantageous as it substantially avoids that any osmotic effect may cause a transfer of pure water from the filling material towards the cover. Any such transfer, in fact, can disadvantageously reduce the passivating effect of the passivating material by lowering through dilution the pH of the solution in contact with the inner surface of the raceway cover.

Preferred examples of a suitable polymeric porous material are: foams derived from natural rubber latex; cellulose; ethylene vinyl acetate copolymer (EVA); polyurethane, in particular polyurethane-based expanded materials in foam or sponge form like those described in U.S. Pat. No. 4,638,017 (entitled "Hydrophilic polyurethane/polyurea sponge"), U.S. Pat. No. 4,738,992 (entitled "Hydrophilic polyurethandpolyurea sponge"), U.S. Pat. No. 4,377,645 (entitled "Dimensionally-stable polyurethane sponge and sponge-forming prepolymer"), U.S. Pat. No. 3,463,745 (entitled "Polyurethane sponge and processes therefor"), U.S. Pat. No. 3,873,476 (entitled "Hydrophilic polyurethane foam") and US 2009/0264549 (entitled "Variable felted polyurethane foams for sponges and wipes").

In this way, when a layer of suitable thickness, sorptivity and porosity of such material in foam or sponge form is inserted between the cover and the upper surface of the wet filling material, the alkaline aqueous solution impregnating the latter rises from the pores of the filling material into the polymeric porous material due to capillarity and can then get in touch with the inner surface of the raceway cover passivating the same.

Preferably, the thickness of the polymeric porous material is equal to or preferably higher than the thickness of any space that may be created between the upper free surface of the wet basic filling material and the inner surface of the raceway cover.

More preferably, the thickness of the layer of polymeric porous material before closing the raceway with the cover has a value of from 0.5 to 2 cm.

In a preferred embodiment, said polymeric porous material has a sorptivity value comprised of from 5 to 50 $(mm/min^{1/2})$, preferably of from 10 to 15 $(mm/min^{1/2})$.

Within the framework of the description and in the subsequent claims, the sorptivity value is determined by means of the following procedure.

A) A sponge having a parallelepipedic shape of 48 mm×48 mm×50 mm is laid to rest on its 23 $cm^2$ face on the flat bottom of a 90 mm diameter Petri capsule.
B) A film of water or alkaline solution having a pH of 11.5 and a height of about 0.5 mm is then carefully maintained on the bottom of the container until the absorption by the sponge becomes asymptotic over time.
C) Periodical weighting of the sample or direct measurement of the wetted sponge height consent to quantify such absorption is carried out at time intervals of 0.1 to 0.5 mm.

In this way, due to the fact that the filling material has a much lower sorptivity (of the order of 0.2 $mm/minute^{1/2}$) than the polymeric porous material in foam or sponge form, the water tends to remain in the pores of the polymeric porous material rather than in the pores of the filling material thereby avoiding that any harmful osmotic effects causing transfer of pure water from the cover towards the filling material may take place in operation.

In a preferred embodiment, said polymeric porous material has a mean pore diameter comprised of from 20 to 200 µm, preferably of from 40 to 100 µm.

In this way, a capillary effect allowing a rise of the order of 1 cm in the polymeric porous material may be achieved.

Within the framework of the description and in the subsequent claims, the capillary rise is calculated by means of the following formula $$h = 2t \cos \theta / \rho g r$$

wherein:
h is the capillary rise (m); t is the water surface tension (N/m); $\theta$ is the contact angle; $\rho$ is the water density ($kg/m^3$); g is the gravity acceleration (9.8 $m/sec^2$); and r is the pore radius (µm).

For example, with a polyurethane foam having the following characteristics:

$$t=0.037 \text{ N/m}, \theta=77, \rho=1000 \text{ kg/m}^3,$$

the capillary rise vs. pore diameter has the trend set forth in Table 1.

TABLE 1

| Pore diameter (µm) | Capillary rise (cm) |
| --- | --- |
| 50 | 6.8 |
| 100 | 3.4 |
| 150 | 2.3 |
| 200 | 1.7 |
| 300 | 1.1 |

In this way, a layer of porous material having a thickness of 1 cm and a compression degree equal to 50% of its initial height, allows to bring the aqueous solution impregnating the filling material in contact with the inner surface of the raceway cover taking into account that the gap which may be formed between the upper surface of the filling material and the inner surface of the raceway cover does not generally exceed 5 mm.

In a preferred embodiment, said polymeric porous material has a compression modulus K of from 10 to 10,000 $N/m^2$.

Within the framework of the description and in the subsequent claims, the compression modulus of a polymeric porous material is given by the formula $$K = \Delta P \times V / \Delta V$$

wherein $\Delta P$ is the pressure variation acting on a material element of initial volume V and $\Delta V$ the corresponding volume variation.

As an example, in the case of the soft part of a Vileda® VILSP004 Glitzi Superstark kitchen sponge, the compression modulus K was evaluated with the following procedure.

A circular sample 24 mm in diameter was cut from a layer of polymeric porous material of initial thickness 13.5 mm. The sample resting on a flat plane was then uniformly pressed with a cylindrical disc having a weight of 100 g and a diameter of 24 mm. As far as the compression is limited (<80%) the defamation is mainly in the vertical direction and the sample thickness reduced to 5.5 mm.

Thus, $\Delta V/V=8/13.5=0.59$ and the applied pressure is $\Delta P=0.981$ (N)/$4.52^{-4}$ (m$^2$)=2170 Pa.

The resulting modulus was K=2170/0.59=3670 Pa.

Knowing the compression modulus K of a given polymeric porous material it is then possible to calculate the clamp force, if any, required to close the cover as a function of the gap and of the initial thickness of the polymeric porous material layer.

As an example, a polyurethane based foam with a compression modulus K of 3680 Pa, a cover weight of 23 kg/m$^2$ and initial thickness of 1 cm can be easily compressed to fill a gap of 7 mm by applying a total clamping force of 180 Kgf.

In this way, for any given combination of expected gap and material properties the initial thickness can be tailored to optimize the clamping force.

In a preferred embodiment, said basic passivating layer is directly in contact with said wet basic filling material embedding said at least one electrical cable.

This feature is particularly advantageous since it avoids the formation of any air gap between the lower surface of the raceway cover and the upper surface of the wet basic filling material which could be hamper heat dissipation from the cable.

The Applicant has surprisingly experimentally found that by placing the inner surface of the raceway cover in contact with the above-described basic passivating material, corrosion rates below 1 μm per year may be achieved.

In particular and as will be described in more detail hereinbelow, corrosion rates between 0.45 and 0.75 μm/year were measured with gravimetric and polarisation resistance methods on galvanized steel embedded in cement mortar for 7 months.

According to a preferred embodiment of the electrical power transmission line of the invention, the line comprises three cables, preferably arranged according to a trefoil configuration.

The trefoil configuration of the cables advantageously allows to obtain a reduction of the magnetic field which is about twice the reduction of the magnetic field obtainable by three cables arranged side by side on a plane.

Within the framework of the present description and in the following claims, the term: trefoil configuration is used to indicate a configuration wherein the centres of the three cables occupy the vertices of a substantially equilateral triangle.

More in particular, the trefoil configuration may be either of the so-called open, or of the so-called "closed" type, depending on the fact that there is a reciprocal contact between the cables or not. In other words, in the case of an open type trefoil configuration, the length of each side of the equilateral triangle at the vertices of which the cables are placed is greater than the diameter of each cable, while, in the case of a closed type trefoil configuration, the length of each side of the equilateral triangle at the vertices of which the cables are placed is substantially equal to the diameter of each cable.

Preferably, the base of the raceway comprises a bottom wall, for example substantially flat, and a pair of side walls, for example substantially flat. In such way, the manufacture of the base is advantageously simplified.

Preferably, the cover of the raceway is substantially flat.

Preferably, the side walls of the base extend in a direction substantially perpendicular to the bottom wall.

Preferably, in a trefoil configuration of the cables of the closed type, the width of the bottom wall is comprised between 1.9-3 times the diameter of the electrical cables housed within the raceway and more preferably is equal to about 2.1 times the diameter of the electrical cables housed within the raceway.

Preferably, in a trefoil arrangement of the cables of the closed type, the height of the side walls, defining the height of the shielding element, is comprised between 1.8-3 times the diameter of the electrical cables housed within the raceway and more preferably is equal to about 2.2 times the diameter of the electrical cable housed within the raceway.

The base of the raceway may have a U-shape provided with bevelled corners according to a predetermined bending radius, which advantageously allows preserving the ferromagnetic characteristics of the material of the raceway, or a V-shaped cross-section provided with sharp corners.

in the case of the embodiment with a U-shaped cross-section provided with bevelled corners, the bending radius is preferably equal to about 0.4-0.7 times the diameter of the electrical cables housed within the raceway as described in the US patent application No. 2007/0144754 of the same Applicant.

In a preferred embodiment, the electrical power transmission line according to the present disclosure may be placed underground, preferably at 1 to 1.5 meters below the ground level, so as to maximize the mitigation effect of the magnetic field generated by the cable.

The electrical power transmission line according to this invention may also be placed within the wall constructions of large-scale buildings, in which electrical power is transmitted at medium or high voltage along a main line before being converted into low voltage at each single user point.

In a preferred embodiment, both the base and the cover of the electrical power transmission line of the invention are substantially continuous, i.e. the outer surface of said base and of said cover is substantially devoid of any macroscopic interruption.

In a second aspect thereof, the present disclosure relates to a method for protecting from corrosion a raceway made of ferromagnetic material of an electrical power transmission line comprising at least one electrical cable, said raceway comprising a base and a cover defining an inner housing space for housing said at least one electrical cable.

More specifically, the present disclosure relates to a method comprising:
a) providing said at least one electrical cable in said inner housing space;
b) filling said inner housing space with a wet basic filling material having a pH comprised between 11 and 13 so as to embed said at least one electrical cable in the wet basic filling material; and
c) coupling a basic passivating material to an inner surface of the cover facing the filling material, said passivating material having a pH value capable of passivating said inner surface.

Most advantageously, the method of the invention allows protecting from corrosion the raceway and, more specifically, its cover, in a very simple and cost-effective manner also simplifying the laying operations of the raceway in a trench.

Preferably, the basic passivating material has a pH of from 10 to 14, more preferably of from 11 to 13.

In a preferred embodiment, filling said inner housing space comprises:
  depositing a first layer of the wet basic filling material in said inner housing space;

laying said at least one electrical cable on said first layer; and depositing at least a second layer of the wet basic filling material around said at least one electrical cable.

In this way, it is advantageously possible to arrange the at least one electrical cable within the inner housing space defined in the raceway in a very simple manner.

Preferably, the wet basic filling material is a basic filling material as disclosed herein.

Preferably, the basic passivating material is a passivating material as disclosed herein.

Preferably, coupling the basic passivating material to the inner surface of the cover comprises coupling the basic passivating material to the whole inner surface of the raceway cover facing the basic filling material.

In this way, it becomes advantageously possible to avoid in a fairly simple and cost-effective way the formation of electrochemical potential differences which may trigger corrosion phenomena of the cover.

In a preferred embodiment of the method, the basic passivating material is the aforementioned water swellable material and coupling the basic passivating material to the cover of the raceway comprises: applying a layer of the water swellable material on an upper free surface of the wet basic filling material, coupling the cover to the base of the raceway and allowing the water swellable material to swell in a space defined between the upper free surface of the wet basic filling material and the inner surface of the cover.

In this way and as already outlined above, the water swellable material advantageously passivates the cover of the raceway by putting the latter in ionic contact with the wet basic filling material by means of a spontaneous mechanism, that is, by virtue of the swelling phenomena taking place once the water swellable material is laid on the upper free surface of the wet filling material.

The water swellable material, in fact, spontaneously absorbs the ion-laden basic aqueous solution impregnating the wet basic filling material expanding and forming a gel-type basic passivating layer having the same pH of the wet filling material and which comes in contact with the whole inner surface of the raceway cover passivating the same and eliminating or at least minimizing any corrosion phenomena.

In another preferred embodiment of the method, the basic passivating material is the aforementioned basic mortar having a pH comprised between 11 and 13 and coupling the basic passivating material to the cover of the raceway comprises: applying a layer of the basic mortar to the inner surface of the cover and coupling the cover to the base of the raceway.

In this way and as already outlined above, the basic mortar or the mono-component anti-corrosion cementitious mortar advantageously directly passivate the cover of the raceway by means of a direct contact with the same.

In another preferred embodiment of the method, the basic passivating material is the aforementioned polymeric porous material and coupling the basic passivating material to the cover of the raceway comprises: applying a layer of said polymeric porous material on an upper free surface of the wet basic filling material and coupling the cover to the base of the raceway so as to compress the polymeric porous material in a space defined between the upper free surface of the wet basic filling material and the inner surface of the cover.

In this way and as already outlined above, a layer of polymeric porous material having a suitable thickness equal to or preferably higher than the thickness of any space that may be created between the upper free surface of the wet basic filling material and the inner surface of the cover, preferably a thickness comprised between 0.5 cm and 2 cm, advantageously passivates the cover of the raceway by putting the latter in ionic contact with the wet basic filling material by means of a spontaneous mechanism, that is, by virtue of liquid upraise by capillarity taking place once the polymeric porous material is arranged between the upper free surface of the wet basic filling material and the inner surface of the cover.

BRIEF DESCRIPTION OF THE DRAWINGS

Additional features and advantages will be more clearly apparent in the light of the detailed description of some examples of the present invention. This description, provided below, relates to the attached drawings provided solely by way of example and without restrictive intent, in which.

DETAILED DESCRIPTION OF THE PREFERRED EMBODIMENTS

Figure 1:
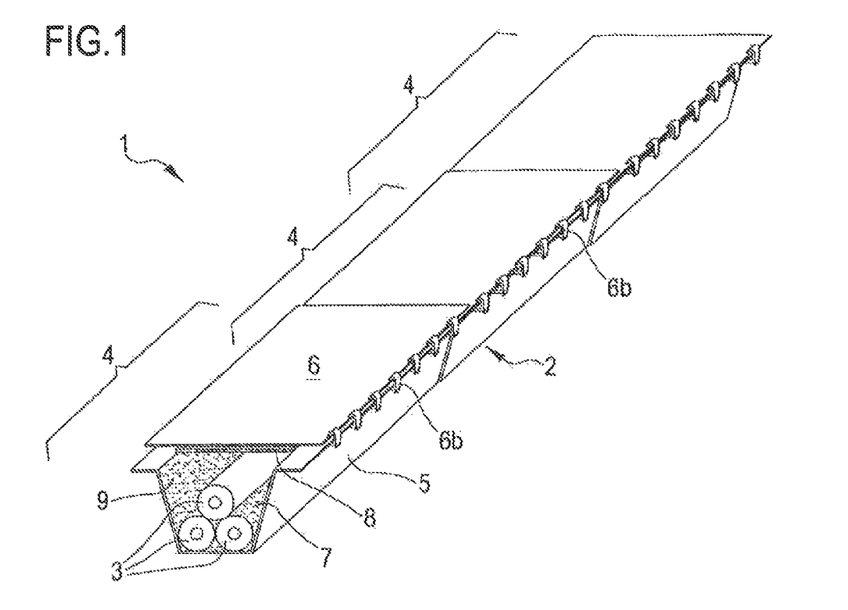
FIG. 1 is a perspective view of an electrical power transmission line comprising a corrosion-protected raceway according to a first preferred embodiment of the invention.
Figure 2:
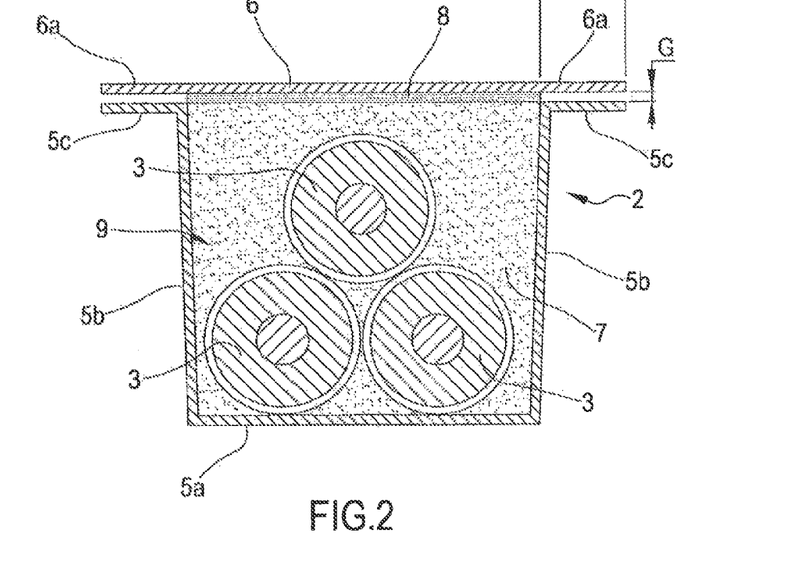
FIG. 2 is a cross-sectional view of the electrical power transmission line shown in FIG. 1.

With reference to FIGS. 1 and 2, an electrical power transmission line for three-phase transmission at medium or high power according to a preferred embodiment of the invention, is generally indicated at 1.

The electrical power transmission line 1 comprises three cables 3 and a raceway 2 made of ferromagnetic material comprising a base 5 and a cover 6 defining together an inner housing space 9 for housing the three cables 3.

A wet basic filling material 7 is also housed in the inner housing space 9 filling the space not occupied by the cables 3, while a layer 8 of a basic passivating material is in contact with the whole inner surface of the raceway cover 6 facing the wet basic filling material 7.

The cables 3 are suitable to carry an alternating current at a frequency typically comprised between 50 and 60 Hz and are arranged in contact with each other in a trefoil configuration (in other words with their geometrical centres positioned as the vertices of a substantially equilateral triangle).

The electrical power transmission line 1 is for example a high power line suitable to operate at a voltage of about 132 kV and a current of about 400 A, and able to carry currents up to 860 A. The electrical power transmission line 1 is particularly intended for underground application, although its shielding properties make it suitable also for use aboveground.

Each of the cables 3 may comprise, for example, an enamelled copper Milliken conductor, insulated with extruded polymer insulation, for example of cross-linked polyethylene (XLPE) type. The Milliken conductor may have, for example, a cross section of 1600 mm$^2$. The outer surface of each cable may also be provided with a metal sheath for protection from moisture. The total external diameter of each cable is typically of 100 mm.

The cables 3 may be tied in the trefoil configuration by means of fasteners or the like. Alternatively, with a proper selection of the dimensions of the raceway 2, one or more wedge members, preferably made of wood, may be placed between the cables 3 and the internal walls of the raceway 2, at suitable distances, to keep the cables 3 in the trefoil configuration along the line 1.

Moreover, the cables 3 arranged in the trefoil configuration may be in direct contact with the bottom of the raceway 2 or may be raised with respect thereto, in a position that is closer to the geometrical centre of the cross-section of the raceway 2. To raise the cables 3 cables 3 arranged in the trefoil configuration, shim members (not shown) may be provided between the raceway 2 and the cables 3.

The raceway 2 is a modular conduit comprising a plurality of longitudinal sections 4 (only three of which are shown in FIG. 1), having a typical length of a few meters (2-4 m), joined end to end to form an extended raceway 2.

The length of each section 4 is selected according to practical considerations, such as the weight of the section and the method of laying down the raceway 2. For example, in case the laying operation is to be made manually, the length of each section 4 should be such to provide a weight which can be easily handled by the involved personnel. In other cases, for instance if mechanical laying operation is contemplated, different selection criteria may be applied.

Each section 4 comprises two separate members, in particular a base 5 and a cover 6, which are superimposed and coupled to each other to define a substantially closed tubular duct wherein the aforementioned inner housing space 9 is defined. Preferably, the sections 4 have the same length and each cover 6 has the same length and width of the corresponding base 5. Moreover, the bases 5 and the covers 6 preferably have the same thickness, which is preferably comprised between 3 mm and 10 mm.

As is better shown in FIG. 2, the base 5 may have a substantially U-shaped cross-section and the cover 6 may have the shape of a flat rectangular sheet. In greater detail, the base 5 may have a bottom wall 5a, two lateral walls 5b outwardly extending from the bottom wall 5a and slightly inclined with respect to the same, and two flanges 5c parallel to the bottom wall 5a and extending laterally outwardly from the end portions of the lateral walls 5b to form respective "wings" of the base 5.

The base 5 may be manufactured, for example, by folding a flat rectangular metal sheet along four substantially parallel lines. In use, if the excavation operations and installation of the raceway 2 are correctly performed, the bottom wall 5a and the flanges 5c should preferably lie horizontally.

The cover 6 is positioned with its lateral edges aligned to those of the base 5, so that lateral portions 6a of the cover 6 are superimposed to the flanges 5c. Two superposition regions are thus defined, on both sides of the raceway 2, having a width corresponding substantially to the lateral dimensions of the flanges 5c. Said width is preferably comprised between 10 mm and 150 mm.

To improve the magnetic field confinement properties of the raceway 2, the ratio between the width of the superposition region and the possible air gap between flange 5c and lateral portion 6, indicated respectively with W and G in FIG. 2, should preferably be greater than 5. Moreover, the total air gap in the cross-section of the raceway 2, which is twice the gap G on each side of the raceway, is preferably lower than 3%, more preferably lower than 1%, of the raceway cross-section perimeter (not including the flanges 5c and the lateral facing portions 6a of the cover 6), to allow magnetic circulation.

In an alternative embodiment (not shown), the gap between the flanges 5c and the lateral facing portions 6a of the cover 6 may be (at least partially) filled with a material having a magnetic permeability greater than air. For example, a packing member of magnetic rubber may be interposed between the flanges 5c and the lateral facing portions 6a of the cover 6 on each side of the raceway 2. Alternatively, a rigid packing member made of steel or other material with high magnetic permeability can be used. As a further alternative, it can be used a resin or a glue filled with a material having high magnetic permeability, such as iron powder. By increasing the magnetic permeability between the base 5 and the cover 6, the magnetic continuity of the raceway 2 is improved. Advantageously, the material of said packing member may be chosen as having a low electrical resistivity, so as to improve the electrical connection between the base 5 and the cover 6. Alternatively, it is possible to use a material having high electrical conductivity and low magnetic permeability, such as copper. Any residual air gap between the flanges 5c and the lateral facing portions 6a of the cover 6, not filled by the packing member, should preferably have the maximum dimensions previously stated.

In operation, the layer 8 of basic passivating material has a thickness preferably comprised between 3 mm and 5 mm.

In a preferred embodiment, the raceway 2 is provided with a plurality of coupling elements adapted to fix together the cover 6 to the base 5, which coupling elements may be either metal fusion joints (not shown) or applied elastic members (shown as 6b in FIG. 1) suitable to clamp the cover 6 to the base 5.

In a preferred embodiment, the longitudinal opposed ends of the sections 4 may be partially overlapping and the sections 4 are longitudinally joined together by means of the aforementioned coupling elements.

By providing the raceway 2 with coupling elements it is possible, besides fixing together the two pieces (base 5 and cover 6) and reducing any possible gap at the interface therebetween, to create an electrical contact between the base 5 and the cover 6 which ensures a continuous flux of the magnetic field lines as described in International patent application WO 2004/034539 in the name of the same Applicant.

The present invention is further described in the following examples, provided merely for illustration purposes and which should not be regarded in any way as limiting the invention.

EXAMPLE 1

Evaluation of Water Absorption and Sorptivity Values of a Sodium Polyacrylate Powder as a Function of pH In order to determine the feasibility of the use of a sodium polyacrylate powder for the purposes of creating a passivating material suitable for the purposes of the invention upon contact with the aqueous solution which impregnates the pores of a basic filling material of the raceway 2, the following experimental measurements of the absorption/swelling capacity and sorptivity of such a material with respect to pure water and to a basic solution were carried out.

The absorption capacity of water swellable materials, in fact, is affected by acidity and alkalinity (pH), conductivity and other factors that may inhibit expansion of gel particles.

In particular, this behaviour was found with saturated solutions of calcium hydroxide, that is, the main constituent of the aqueous solution filling the pores of a basic wet filling materials such as concrete of the raceway of a an electrical power transmission line.

Figure 3:
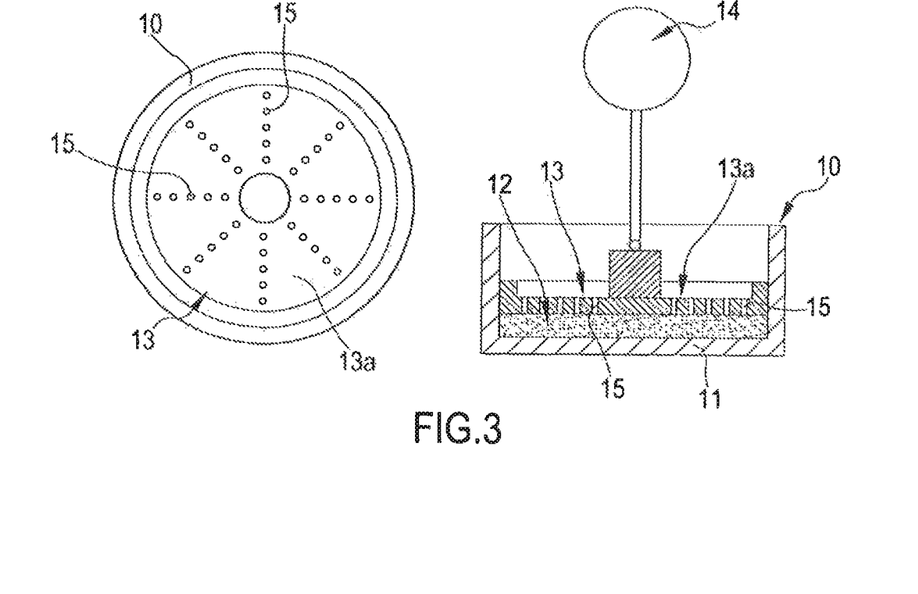
FIG. 3 shows a test apparatus for water absorption/swelling and sorptivity value measurement on a water swellable material according to a preferred embodiment of the invention.

The tests were performed with the test apparatus shown in FIG. 3.

This test apparatus comprised a cylindrical container 10 having a flat bottom 11 on which a dosed amount (0.15 g) of a dry sodium polyacrylate powder (SAP 10SHF produced by Sanyo) was uniformly spread to form a layer 12.

A circular perforated disc 13 made of polytetrafluoroethylene (PTFE) having a weight of 59 g, an area of 43 cm$^2$, a thickness of 0.7 cm and total number of 60 through holes 15 having a diameter of 0.2 cm, was placed on top of the powder layer 12 and the head of a micrometer 14 (Mitutoyo NO 2052-10, precision 0.01 mm) was put in contact with the upper surface 13a of the disc 13.

The dial of the micrometer 14 was zeroed and then a saturated Ca(OH)$_2$ solution having pH 11.5 was gently poured in the container maintaining the level just above the holes 15 of the disc 13. At the same time, a timer (not shown) was started and the dial reading registered at suitable time intervals of 10 to 20 sec.

The result of two tests carried out in pure water and in saturated Ca(OH)$_2$ solution at pH 11.5 are reported in FIG. 4a and summarized in Table 2 hereinbelow assuming an apparent density for the sodium polyacrylate powder of 0.1 g/cm$^3$.

TABLE 2

| | Swelling ratio upon gelling | |
|---|---|---|
| | Weight/weight | Volume/volume |
| Pure water | 1.8 × 43 × 1/0.15 = 516 | 1.8 × 43/(0.15/0.1) = 52 |
| pH 11.5 pore water | 0.5 × 43 × 1/0.15 = 143 | 0.5 × 43/(0.15/0.1) = 14 |

Figure 4A:
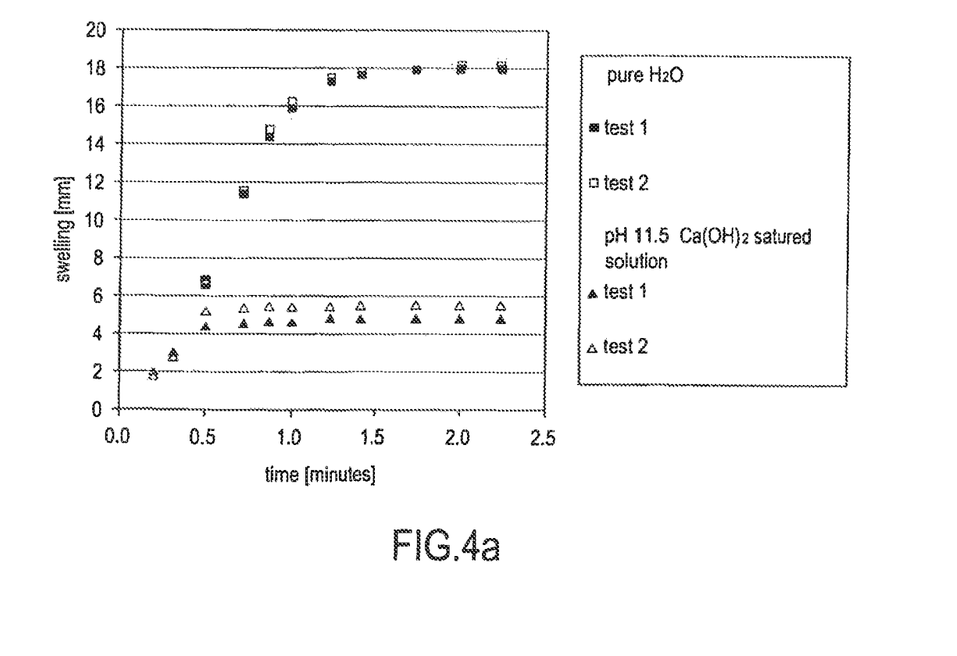
FIGS. 4a and 4b show the results of absorption and sorptivity experimental tests.

In FIG. 4a, the results are reported in terms of swelling (mm) (in ordinate) of the sodium polyacrylate powder layer vs. time in minutes (in abscissa) of exposure to liquid water at 20° C. (squares) and to saturated Ca(OH)$_2$ solution of pH=11.5 (triangles). The black square and triangles refer to the first test and the white ones to the second test.

The results show that the expansion degree with the saturated Ca(OH)$_2$ solution was about 27% of the expansion degree achieved with pure water, which is indicative of a swelling ability of the tested material entirely acceptable for the purposes of creating in use a passivating material layer 8 in contact with the inner surface of the raceway cover 6.

Additionally, the tests also showed that sodium polyacrylate, in an alkaline solution, produces a gel that has the same ionic character of the absorbed solution.

Figure 4B:
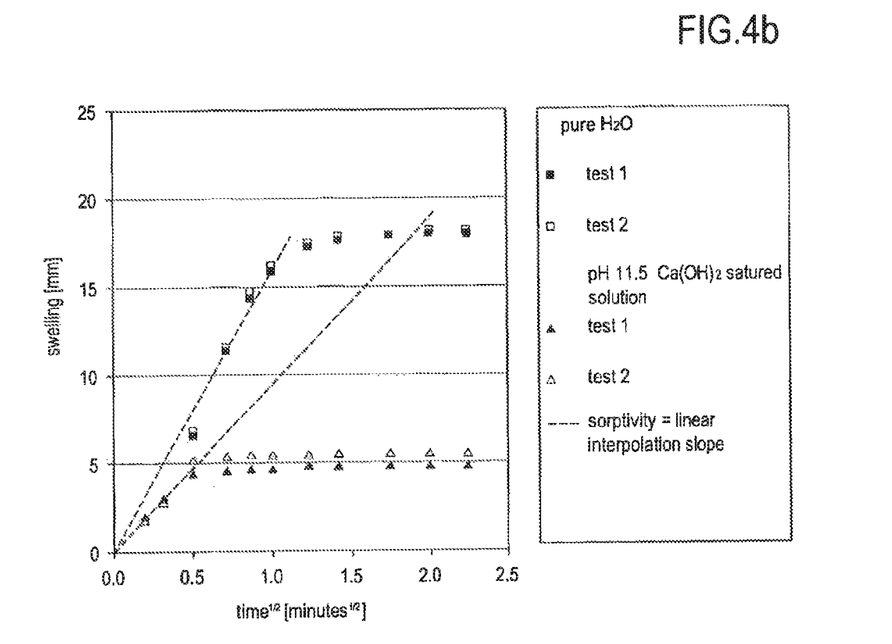

The same data of FIG. 4a are reported vs. the square root of time in FIG. 4b and summarized in Table 3 hereinbelow. Also in this case, the black square and triangles refer to the first test and the white ones to the second test. The sorptivity S was evaluated from the slope of the rectilinear portion of the plots reported in FIG. 4b according to the equation $$z = St^{1/2}$$

wherein z is the swelling (as height increase of the layer) and t the time.

TABLE 3

| | Sorptivity (mm/minute$^{1/2}$) |
|---|---|
| Pure water | 16.5 |
| pH 11.5 pore water | 9.6 |

EXAMPLE 2

Comparative

Evaluation of the Passivation of HDG Steel and Bare Steel in Cement Mortar

Figure 5:
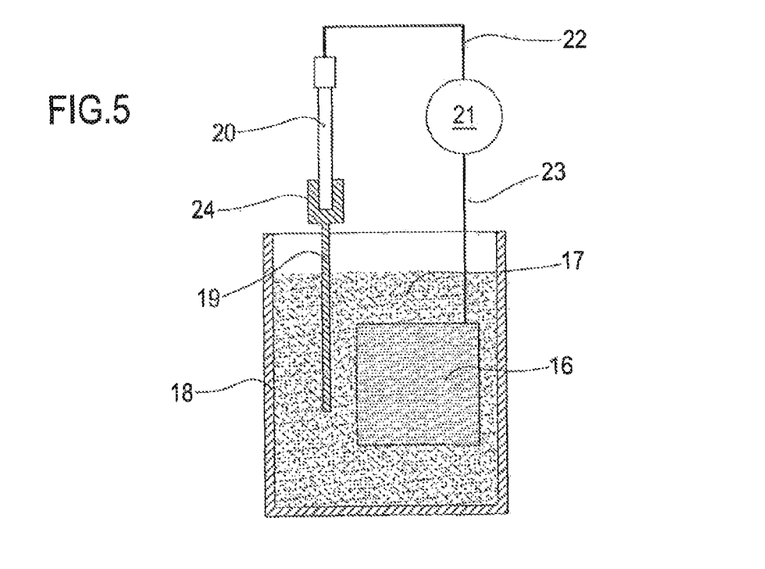
FIG. 5 shows a test apparatus for measuring the passivation of HDG and bare steel samples embedded in cement mortar.

In order to demonstrate the passivating effect of a filling material made of cement mortar on an embedded HDG steel and bare steel, the following tests were carried out using the test apparatus shown in FIG. 5.

More specifically, HDG steel and bare steel samples made of a square 100 mm×100 mm sheet 16 having a thickness of 2.5 mm were embedded in a 18 kg cement mortar filling 17 housed in a plastic cylindrical container 18 having a diameter of 25 cm and a height of 14 cm along with an insulated electrical connection and a conductive gel-filled glass capillary conduit 19 to make an electrolytic path between the aqueous solution impregnating the cement mortar near the surface of the sample 16 and a calomel reference electrode 20 (AMEL reference electrode type R1/4MMSKT) outside the mould. The cement mortar had the following composition: siliceous sand 86 wt %, OPC 4.5 wt % and tap water 9.5 wt %.

The cement mortar had a pH of 11.7 in the as mixed condition.

The tip of the calomel reference electrode 20 was in particular inserted in a small glass container 24 in fluid communication with the capillary conduit 19.

The capillary conduit and the bottom of the glass container were filled with a small pump with a hot (100° C.) mixture of Agar-Agar (5 g) and saturated NaNO$_3$ aqueous solution (100 cm$^3$). The mixture was allowed to cool on site at room temperature and developed in a conductive gel. The upper part of the container was filled with saturated NaNO$_3$ aqueous solution in order to cover the tip of the electrode. In this way, the reference electrode and the aqueous solution impregnating the cement mortar in the proximity of the steel electrode surfaces were put in a high conductivity electrolytic contact allowing the relevant potential measurement avoiding any risk of both steel depassivation due to chloride ion leakage from the electrode and of electrode deterioration due to high pH solution from the mortar.

The calomel reference electrode 20 and the sample steel sheet forming itself an electrode, were then electrically connected to a Keithley Model 2000-20 6-1/2-Digit DMM w/20-Ch Scanner Card high impedance voltmeter 21 by respective wires 22, 23.

Figure 6:
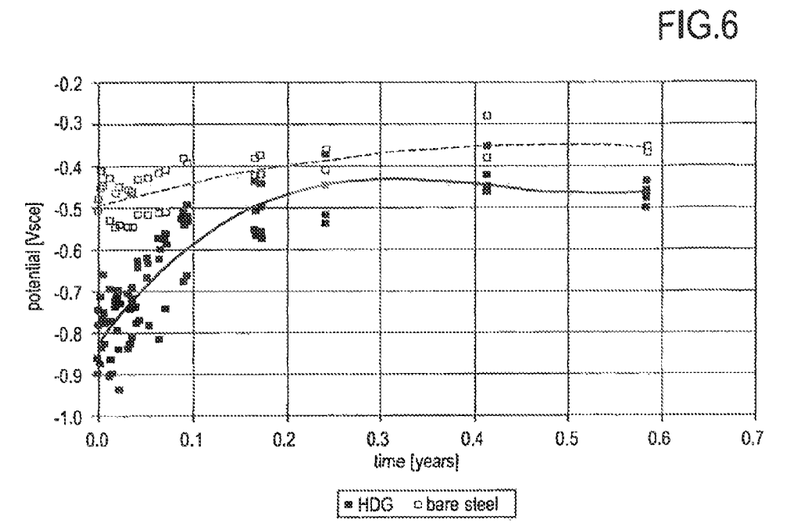
FIG. 6 shows the values of electrode potential during the passivation of HDG and bare steel embedded in cement mortar.

The results reported in FIG. 6 (wherein in abscissa the time is expressed as year in ordinate the potential is expressed as Vsce) show that during a test period of 7 months the electrode potential of HDG steel samples (black squares) passed from an initial ~−0.9 Vsce potential (active state) to a final ~−0.4 Vsce potential value (passive state). The bare steel sample (white squares) passivated too passing from an initial −0.5 Vsce potential (active state) to a final −0.35 Vsce potential (passive state).

Both metals showed negligible corrosion rates when in the passive state. In particular, corrosion rates in the 0.45 to 0.75 μm/year have been measured with the polarisation resistance technique described hereinabove after 7 months of embedding in cement mortar as described in detail in the paper by P. Maioli, R. Sica, P. Anelli, *Evaluation of the life of magnetic shielding raceways underground*, presented at the CIGRE' EMF-ELF-2011 conference, Mar. 24 and 25 2011, Paris.

EXAMPLE 3

Figure 7:
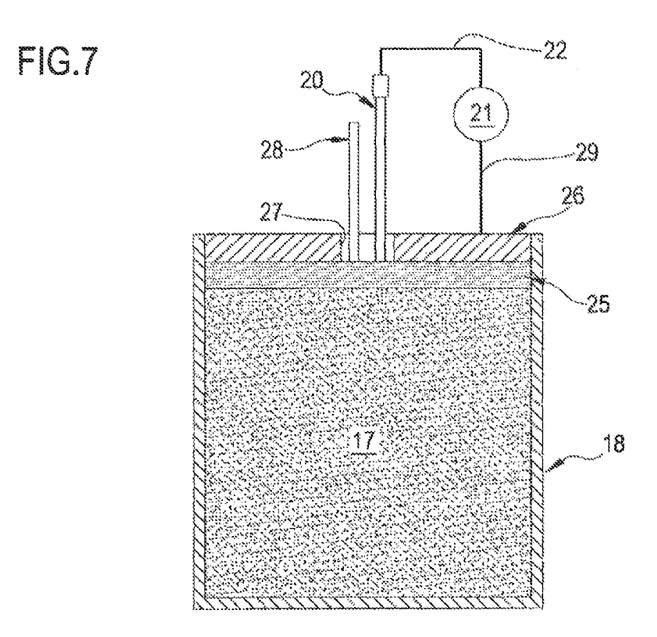
FIG. 7 shows a test apparatus for measuring the passivation of HDG and bare steel samples in contact with water swelling tapes laid on top of cement mortar.

Evaluation of the Passivation of HDG Steel and Bare Steel Achieved by Means of Water Swellable Tapes According to the Invention In order to demonstrate the passivating effect of water swellable tapes according to the present invention the following tests were carried out using a modification of the test apparatus of preceding Example 2 as shown in FIG. 7.

More specifically, three layers 25 of a water swellable tape GFS1120 commercialized by Geca-Tapes (polyester based textile having a weight of 1.5 g and supporting about 34% by weight of sodium polyacrylate powder) including as a whole about 1.53 g of sodium polyacrylate powder (equivalent to about 103 g/m$^2$ of water swellable material as referred to the surface unit of a filling of cement mortar) were placed on the free surface of 1 kg mould of the same cement mortar filling 17 of preceding Example 2 cast in plastic cylindrical container 18 having a diameter of 8 cm and a height of 8 cm.

On top of the tapes, a sample made of a HDG steel or bare steel disc 26 provided with a central through hole 27 having a diameter of 10 mm was placed in free contact with the upper surface of the tapes to allow contacting the swelling tapes layer 25, once gelled, with the calomel reference electrode 20 to measure the steel potential and with a pHmeter 28 (HANNA model HI98103) to measure the pH of the gel itself.

An insulated copper wire 29 welded to the upper outer surface of the disc 26 opposite to the inner surface contacting the tapes layer 25 closed the potential measurement circuit. The upper outer surface of the disc 26 not in contact with the tapes layer 25 was also painted to avoid corrosion outside the contact area.

The plastic container 18 was opened only when performing measurements in order to eliminate water evaporation.

During the tests, the aqueous basic solution impregnating the mortar filling 17 actually gelled the absorptive powder of the tapes causing their powder to reach a gel state.

Figure 8:
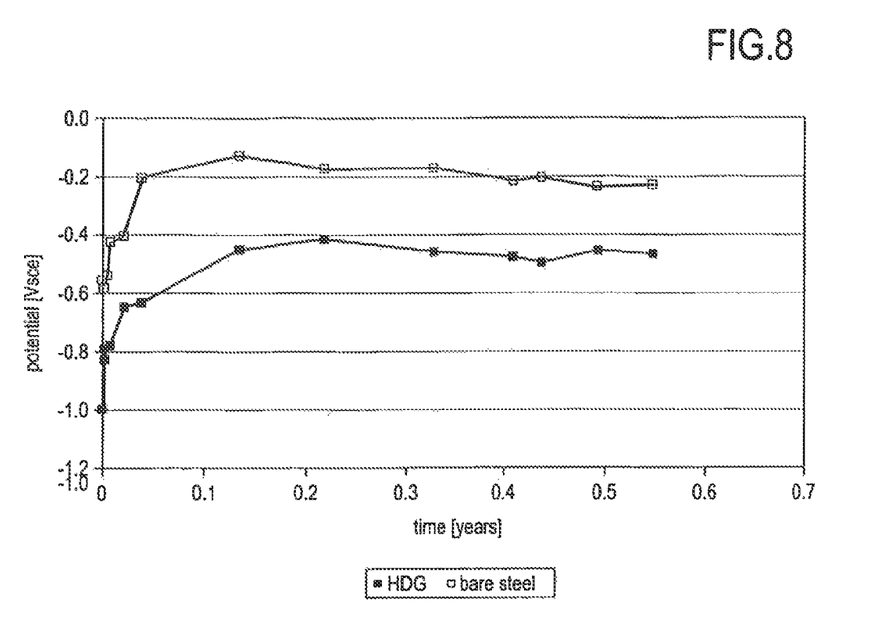
FIG. 8 shows the values of electrode potential during the passivation of HDG and bare steel in contact with water swelling tapes laid on top of cement mortar.

As shown by the test results graphically reported in FIG. 8 (wherein in abscissa the time is expressed as years, in ordinate the potential is expressed as Vsce and wherein the black squares refer to the HDG steel and the white squares refer to the bare steel), the gel so formed contacted the whole inner surface of the steel sample (disc 26) and passivated the same.

The potential values were similar to those showed by the samples of the same material directly embedded in the same cement mortar (FIG. 6—comparative example) since during a test period of 7 months the electrode potential of HDG steel samples (black squares) passed from an initial ~−1.0 Vsce potential (active state) to a final ~−0.43 Vsce potential value (passive state). The bare steel sample (white squares) passivated too passing from an initial −0.6 Vsce potential (active state) to a final −0.22 Vsce potential (passive state).

The pH of the swelled tapes was also measured with a pHmeter inserted in the central through hole and resulted to be 11.5 just after the first 48 hours remaining at that value for the entire test.

On the face facing the tapes (and the mortar) both metals did not show evident signs of corrosion after 6 months. As shown in the previous Example 2, the measured electrode potentials, both in the passive range, are typical of corrosion rates in the 0.45 to 0.75 μm/year range.

These results therefore show that water swellable tapes according to the present invention resting on a filling material made of cement mortar achieve the same level of passivation of HDG steel and bare steel samples as may be achieved by directly embedding the same samples in the same cement mortar.

EXAMPLE 4

Figure 9:
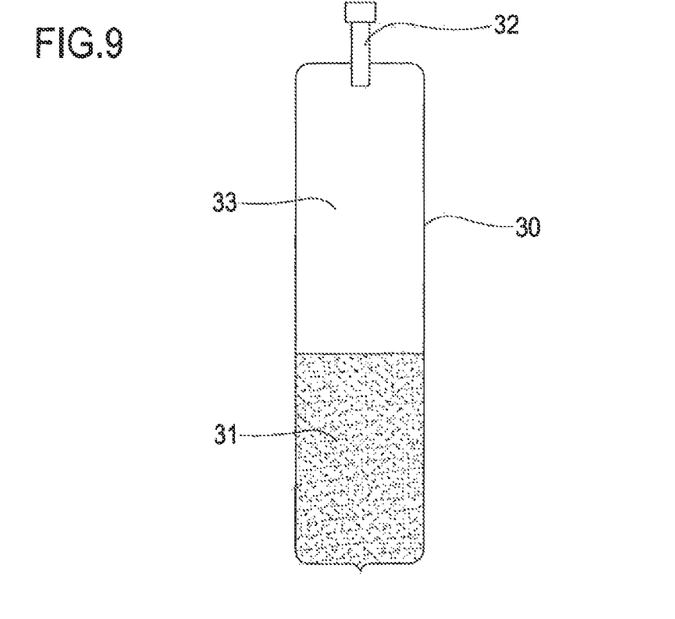
FIG. 9 shows an apparatus for testing aging of a SAP powder.

Evaluation of the Aging Behaviour of Dry and Humidified Sodium Polyacrylate Powder In order to demonstrate the ability of sodium polyacrylate powder to withstand—both in dry and humidified conditions—a thermal aging equivalent to a service life of 40 years at 70° C. without loosing its water gelling properties, the following tests were carried out using the test apparatus shown in FIG. 9.

More specifically, a 750 g sample 31 of sodium polyacrylate powder in various water content conditions (from 5 to 65% water by weight) were stored in a sealed glass cylindrical container 30 having a diameter of 25 cm and a height of 17 cm and submitted to a 2 months aging at 150° C. (equivalent, on a rough Arrhenius law basis to ~40 years at 70° C.).

After cooling, the upper portion of the welding of the container 30 was carefully broken, and a precision capacitive water partial pressure transducer 32 (with temperature sensor General Electric RH-Plus MR2350 100 Pa, 0.2° C. resolution) was hermetically inserted closing the container 30. The container 30 was then equilibrated at different temperatures and the water vapour pressure (that is, relative humidity) in the inner free space 33 of the container 30 was measured at each temperature.

Figure 10:
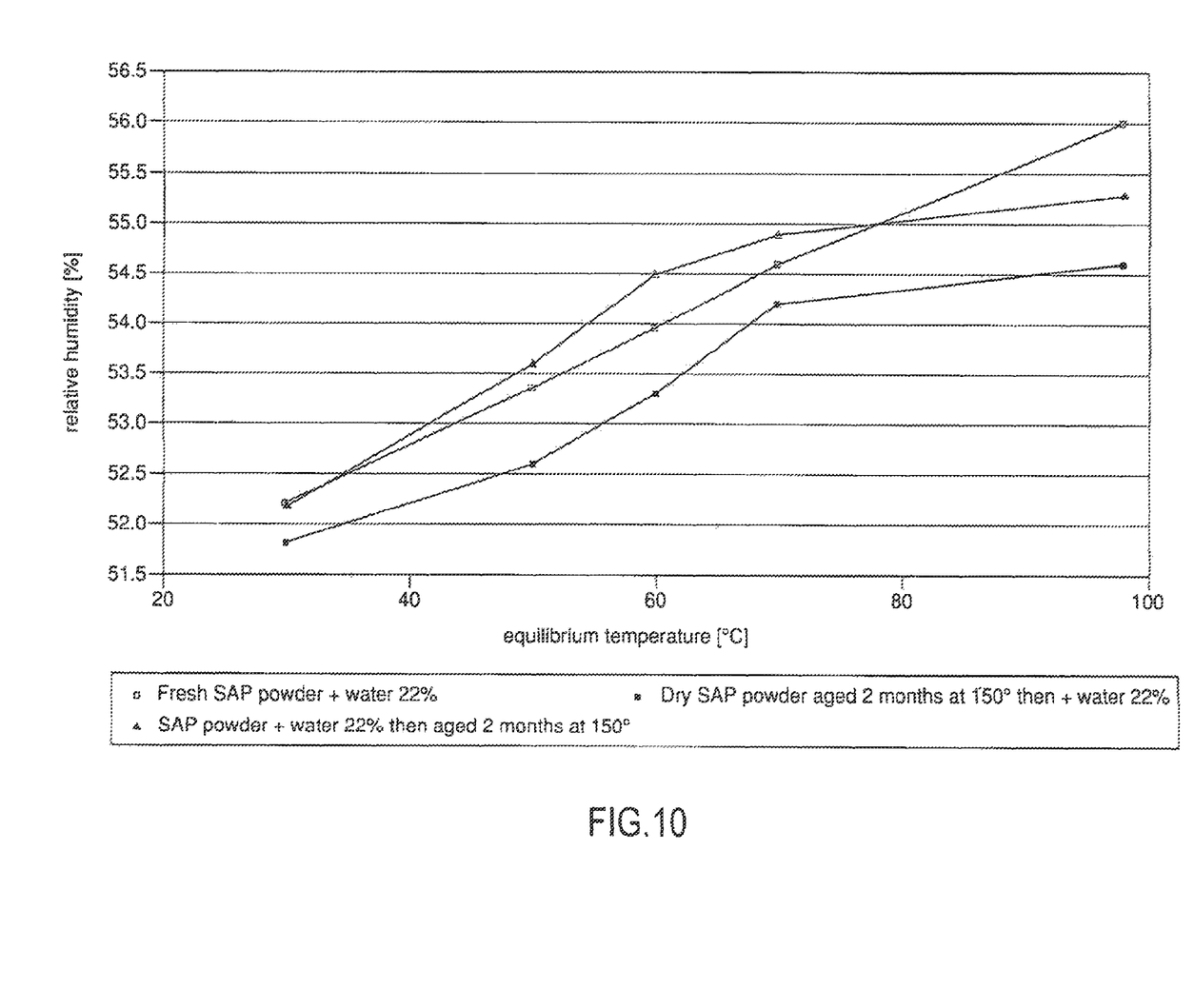
FIG. 10 shows the results of an aging test carried out on a sodium polyacrylate powder.

The aging results are reported in FIG. 10 wherein in ordinate the relative humidity is expressed as % and in abscissa the equilibrium temperature as ° C.). The absorption isotherm (vapour pressure-temperature curve) is practically the same for fresh (white squares) and aged (triangles) humidified sodium polyacrylate powder.

Also, no substantial differences were observed by aging dry powder (black squares) and then humidifying the same. Moreover, the vapour pressure did not show any trend towards 100% relative humidity and this demonstrates that after aging free water is not separated from the mixture, but remains always trapped in the gel.

Accordingly, these tests confirmed the ability of sodium polyacrylate powder to absorb water and to form a gel remaining unchanged after aging.

In addition, a second higher temperature aging test (70 hours at 170° C.) was performed with the same apparatus and with the same procedure with the purpose of detecting any sign of degradation of the sodium polyacrylate powder.

The atmosphere of aged samples was analyzed for volatile degradation products with a gas chromatograph (AGILENT 6890) coupled to a mass selective detector (AGILENT 5970, 70 eV impact mode). The column employed was a 50 m CROMPACK CP-Wax 52CB and the temperatures were in the 200 to 250° C. range. The only detectable traces indicated the presence of fresh powder (esanoic acid; 1-ethyl-2-eptyl cyclopropane; glycine) and/or aged powder (octanoic acid; nonanoic acid; decanoic acid).

Being all the traces detected after aging superior homologues of the fatty acid present as a trace in the fresh sample, the conclusion is that the aging process involves the impurities only and that no important thermal-chemical degradation process up to 170° C. occurred to the SPA powder.

EXAMPLE 5

Evaluation of the Capillary Effect in a Open Cell Polyurethane Foam

Figure 11:
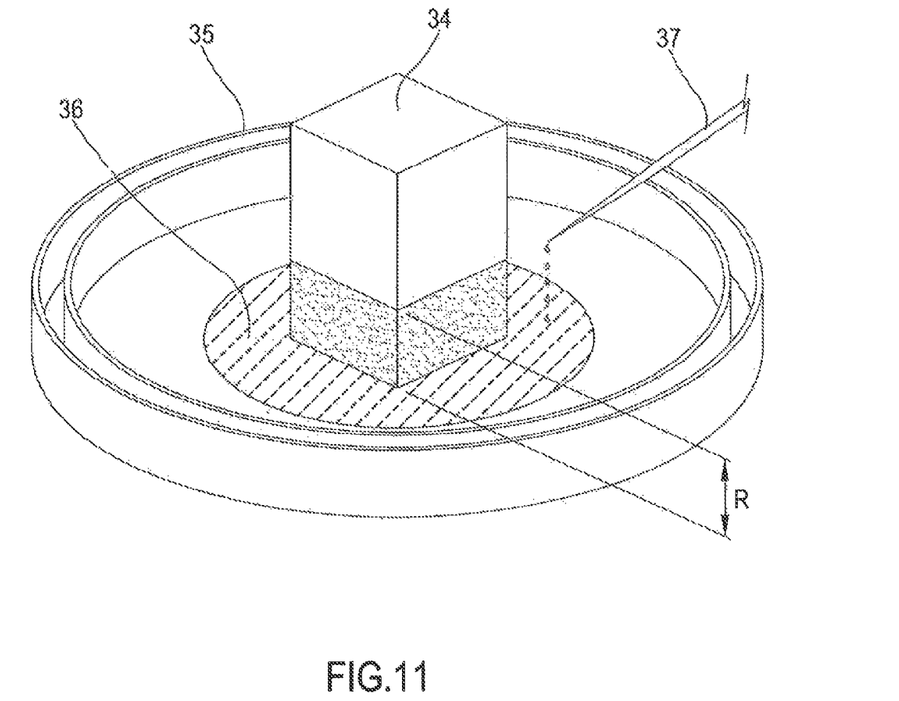
FIG. 11 shows a test apparatus for making capillary rise measurements on a polyurethane sponge sample.

In order to demonstrate the ability of an open cell expanded polymeric layer to absorb and convey the aqueous solution impregnating an underlying cement mortar to the lower surface of a HDG steel or bare steel sample resting on top of the expanded polymeric layer to trigger a passivation process of the samples, the following tests were carried out using the test apparatus shown in FIG. 11.

More specifically, a 4.8×4.8×5=115 cm³ parallelepipedic sample 34 was cut from the yellow part of a polyurethane sponge of a VILEDA® VILSP004 Glitzi Superstark sponge. The weight of the sample 34 was 14.26 g and its apparent density was 0.124 g/cm³.

The compression modulus was measured as reported previously and was K=3760 Pa.

Assuming a density of 0.92 g/cm³ for the polymer, the solid volume was estimated to be 14.26/0.92=15.5 cm³ and its porosity was calculated to be Porosity=Void volume/total volume=(115−15.5)/115=86.5%

The sponge sample 34 was then placed with its lower 4.8×4.8=23 cm² surface on the flat bottom of a Petri capsule 35 having a diameter of 9 cm. Then a solution was gently poured by means of a pipette 37 so that a film 36 of solution having a height of about 0.5 mm stabilizes at the sample base as long the sponge absorbs it.

In a first test with pure water, the test sample 34 absorbed at equilibrium 25 g of water. The absorption was visible from the outside as the sponge surface appeared wet (darker in colour) for a height R of 1.2-1.5 cm (capillary rise).

The absorbed water volume was about 25 cm³.

Being the porosity 86.5%, a 25 cm³ void volume corresponds to 25/0.865=28.9 cm³. Being the area allowing water uptake of 23 cm², the capillary rise R was estimated to be 28.9/23=1.26 cm in reasonable agreement with the visual observation of the test sample 34.

The equilibrium was attained in about 1-2 minutes and an evaluation of the sorptivity value carried out as indicated above indicated a value of about 10 mm/min$^{1/2}$.

The same test was repeated with a saturated $Ca(OH)_2$ solution with a small reduction in capillary rise R which turned out to be in the order of 1.0 cm, possibly due to a small decrease of the water surface tension by $Ca(OH)_2$ as reported in literature (C. Estrela et. al, Journal of Applied Oral Science, 2005; 13(2):152-6).

In view of the above, it may be concluded that when a layer of an open cell expanded foam having a height (thickness) preferably comprised between 0.5 and 2 cm, more preferably comprised between 0.8 and 1 cm, is arranged on top of a filling material made for example of cement mortar in a raceway, the expanded foam may contact the whole inner lower surface of a raceway cover connecting the same with the aqueous solution impregnating the cement mortar and achieving the desired passivation.

The invention claimed is:

1. An electrical power transmission line, comprising:
   at least one electrical cable;
   a raceway made of ferromagnetic material comprising a base and a cover defining an inner housing space for housing said at least one electrical cable; and
   a wet basic filling material housed in said inner housing space and embedding said at least one electrical cable, said filling material having a pH between 11 and 13,
   wherein the inner surface of said cover facing the filling material is in contact with a layer of a basic passivating material arranged between said cover and an upper free surface of a wet basic filling material, said basic passivating material having a pH value capable of passivating the ferromagnetic material,
   wherein said basic passivating material is a polymeric porous material in direct contact with the wet basic filling material and having a sorptivity value from 5 to 50 (mm/min$^{1/2}$) and a mean pore diameter from 10 to 200 μm, and
   wherein said polymeric porous material is selected from: foams derived from natural rubber latex, ethylene vinyl acetate copolymer foams and polyurethane-based expanded materials in foam or sponge form.

2. The electrical power transmission line of claim 1, wherein the basic passivating material has a pH from 10 to 14.

3. The electrical power transmission line of claim 2, wherein the basic passivating material has a pH from 11 to 13.

4. The electrical power transmission line of claim 1, wherein said ferromagnetic material is low carbon hot dip galvanized steel with a zinc layer firmly bonded thereto.

5. The electrical power transmission line of claim 4, wherein said zinc layer has a thickness between 15 and 30 μm.

6. The electrical power transmission line of claim 1, wherein said basic filling material is selected from: cement mortar, alkaline sand, or mixtures thereof.

7. The electrical power transmission line of claim 6, wherein said basic filling material is cement mortar having a pH between 11 and 12.

8. The electrical power transmission line of claim 1, wherein said at least one electrical cable comprises three electrical cables arranged in a trefoil configuration.

9. An electrical power transmission line, comprising:
   at least one electrical cable;
   a raceway made of ferromagnetic material comprising a base and a cover defining an inner housing space for housing said at least one electrical cable; and a wet basic filling material housed in said inner housing space and embedding said at least one electrical cable, said filling material having a pH between 11 and 13, wherein the whole inner surface of said cover facing the filling material is in contact with a layer of basic passivating material arranged between said cover and an upper free surface of the wet basic filling material, said basic passivating material having a pH value capable of passivating the ferromagnetic material, wherein said basic passivating material is a polymeric porous material in direct contact with the wet basic filling material and having a sorptivity value from 5 to 50 $(mm/min^{1/2})$ and a mean pore diameter from 10 to 200 μm, and wherein said polymeric porous material has a compression modulus from 10 to 10,000 $N/m^2$.

10. The electrical power transmission line of claim 9, wherein the layer of said basic passivating material is directly in contact with the wet basic filling material embedding said at least one electrical cable.

11. The electrical power transmission line of claim 9, wherein said at least one electrical cable comprises three electrical cables arranged in a trefoil configuration.

12. A method for protecting from corrosion a raceway made of ferromagnetic material of an electrical power transmission line comprising at least one electrical cable, said raceway comprising a base and a cover defining an inner housing space for housing said at least one electrical cable, comprising:

a) providing said at least one electrical cable in said inner housing space;

b) filling said inner housing space with a wet basic filling material having a pH between 11 and 13 so as to embed said at least one electrical cable in the wet basic filling material; and c) coupling a layer of a basic passivating material to a whole inner surface of the cover facing the filling material so as to arrange said layer between said cover and an upper free surface of the wet basic filling material, said passivating material having a pH value capable of passivating said inner surface, wherein the basic passivating material is a polymeric porous material in direct contact with said wet basic filling material and having a sorptivity value from 5 to 50 $(mm/min^{1/2})$ and a mean pore diameter from 10 to 200 μm, and wherein coupling the layer of the basic passivating material to the cover comprises: applying a layer of said polymeric porous material on an upper free surface of the wet basic filling material and coupling the cover to the base of the raceway so as to compress the polymeric porous material in a space defined between the upper free surface of the wet basic filling material and an inner surface of the cover.

13. The method of claim 12, wherein the basic passivating material has a pH from 10 to 14.

14. The method of claim 13, wherein the basic passivating material has a pH from 11 to 13.

15. The method of claim 12, wherein filling the inner housing space comprises:

depositing a first layer of the wet basic filling material in said inner housing space;

laying said at least one electrical cable on said first layer; and depositing at least a second layer of the wet basic filling material around said at least one electrical cable.

16. The method of claim 12, wherein the wet basic filling material is cement mortar, alkaline sand or mixtures thereof.

\* \* \* \* \*